US 8,346,208 B2

(12) United States Patent  
Chiou et al.

(10) Patent No.: US 8,346,208 B2
(45) Date of Patent: Jan. 1, 2013

(54) METHOD AND SYSTEM FOR IDENTIFYING MOBILE USER CLUSTER BY CALL DETAIL RECORD

(75) Inventors: Ta-Gang Chiou, Taipei (TW);
Wei-Guang Teng, Taipei (TW);
Chao-Chi Chang, Nantou County (TW);
Meng-Seng Chen, Taipei (TW)

(73) Assignee: Groundhog Technologies, Inc., Taiwan (TW)

(*) Notice: Subject to any disclaimer, the term of this patent is extended or adjusted under 35 U.S.C. 154(b) by 1635 days.

(21) Appl. No.: 11/473,056

(22) Filed: Jun. 23, 2006

(65) Prior Publication Data

US 2006/0293025 A1   Dec. 28, 2006

Related U.S. Application Data

(60) Provisional application No. 60/693,008, filed on Jun. 23, 2005.

(51) Int. Cl.
*H04M 11/00* (2006.01)

(52) U.S. Cl. ............ 455/405; 455/406; 455/414.1; 455/418; 379/126; 379/128; 379/121.04

(58) Field of Classification Search .......... 455/418, 455/406, 518, 405, 414.1; 379/121.04, 126, 379/128

See application file for complete search history.

(56) References Cited

U.S. PATENT DOCUMENTS

| 5,483,575 | A | * | 1/1996 | Zdanowski et al. | 455/508 |
|---|---|---|---|---|---|
| 5,940,751 | A | * | 8/1999 | Kaplan et al. | 455/411 |
| 6,023,280 | A | * | 2/2000 | Becker et al. | 345/440 |
| 6,424,840 | B1 | * | 7/2002 | Fitch et al. | 455/456.1 |
| 6,847,710 | B1 | * | 1/2005 | Suda et al. | 379/126 |
| 7,035,619 | B1 | * | 4/2006 | Fargano et al. | 455/406 |
| 7,136,636 | B1 | * | 11/2006 | McLaughlin | 455/423 |
| 7,203,291 | B2 | * | 4/2007 | Morrison et al. | 379/126 |
| 7,328,042 | B2 | * | 2/2008 | Choksi | 455/552.1 |
| 7,457,609 | B2 | * | 11/2008 | Cai | 455/405 |
| 2002/0183960 | A1 | * | 12/2002 | Chiou et al. | 702/150 |
| 2003/0112937 | A1 | * | 6/2003 | Kreckel et al. | 379/126 |
| 2003/0229613 | A1 | * | 12/2003 | Zargham et al. | 707/1 |
| 2004/0009762 | A1 | * | 1/2004 | Bugiu et al. | 455/406 |
| 2005/0159155 | A1 | * | 7/2005 | Chen et al. | 455/435.1 |
| 2005/0191989 | A1 | * | 9/2005 | Plush et al. | 455/406 |
| 2006/0015588 | A1 | * | 1/2006 | Achlioptas et al. | 709/220 |
| 2007/0270123 | A1 | * | 11/2007 | Cai et al. | 455/405 |

OTHER PUBLICATIONS

Lim et al., "Optimal Partitioning of Heterogeneous Traffic Sources in Highway Cellular Systems", Mar. 1997, IEEE Computer Society, vol. 46 Issue 3, pp. 312-325.*

* cited by examiner

*Primary Examiner* — Rafael Pérez-Gutiérrez
*Assistant Examiner* — Allahyar Kasraian

(57) ABSTRACT

A system and method for identifying a mobile user cluster by call detail records (CDRs) is provided. The system and method identifies at least one mobile user cluster according to a plurality of CDRs generated by a plurality of mobile users during a first period and a second period of time. Each mobile user of the identified cluster generates at least one CDR at a same geographical location during the first period of time, and a mobile user sequence is formed between any two mobile users of the identified cluster. At least one CDR is generated between any two neighboring mobile users of the mobile user sequence during the second period of time. Examples for the mobile user cluster include cohabiting family members, familiar neighborhood, colleagues, schoolmates, etc.

19 Claims, 4 Drawing Sheets

METHOD AND SYSTEM FOR IDENTIFYING MOBILE USER CLUSTER BY CALL DETAIL RECORD

CROSS-REFERENCE TO RELATED APPLICATIONS

The present application claims the benefit of U.S. Provisional Application No. 60/693,008, filed on Jun. 23, 2005, which is herein incorporated by reference.

BACKGROUND OF INVENTION

1. Field of the Invention

The present invention relates to a mobile communication network, and more particularly, to a system and method for identifying a mobile user cluster by call detail records.

2. Description of the Prior Art

In a mobile communication network, the mobile service provider generates a corresponding call detail record (CDR) for each call behavior of each subscribed mobile user. The CDR contains various information associated with the call behavior, such as the caller and callee, the staring and ending time, the call cost, the locations of the caller and callee, etc. The caller and callee can be represented by phone numbers. Since the caller and callee usually utilize a base transceiver station (BTS) and its cell at or near the locations of them, an identification code of the BTS and its cell can be used to represent the locations of the caller and callee. The call duration can also be stored in the CDR, and if not stored, the call duration can be derived according to the starting and ending time stored in the CDR.

Since the CDR reflects the time/space aspect of the call behavior, the mobile service provider can analyze the CDR to construct a behavior pattern for the mobile user and extract useful business intelligence from the behavior pattern.

SUMMARY OF INVENTION

It is therefore one objective of the present invention to provide a system and method for identifying a mobile user cluster by call detail records (CDRs), thereby facilitating subsequent business marketing for telecommunication service providers.

According to one embodiment of the present invention, a method for identifying a mobile user cluster by CDRs is provided. The method comprises steps of: identifying a plurality of mobile users according to a plurality of first CDRs generated at a geographical location during a first period of time; and identifying at least one mobile user cluster according to a plurality of second CDRs generated by the mobile users during a second period of time. A mobile user sequence is formed between any two mobile users of the identified cluster, and at least one second CDR is generated between any two neighboring mobile users of the mobile user sequence.

According to another embodiment of the present invention, a method for identifying a mobile user cluster by CDRs is provided. The method identifies at least one mobile user cluster according to a plurality of CDRs generated by a plurality of mobile users during a first period and a second period of time. Each mobile user of the identified cluster generates at least one CDR at a same geographical location during the first period of time, and a mobile user sequence is formed between any two mobile users of the identified cluster. At least one CDR is generated between any two neighboring mobile users of the mobile user sequence during the second period of time.

According to another embodiment of the present invention, a system for identifying a mobile user cluster by CDRs is provided. The system comprises: a storage medium for storing a plurality of CDRs generated by a plurality of mobile users during a first period and a second period of time; and a processor, coupled to the storage medium, for identifying at least one mobile user cluster according to the CDRs. Each mobile user of the identified cluster generates at least one CDR at a same geographical location during the first period of time, and a mobile user sequence is formed between any two mobile users of the identified cluster. At least one CDR is generated between any two neighboring mobile users of the mobile user sequence during the second period of time.

DETAILED DESCRIPTION

Figure 1:
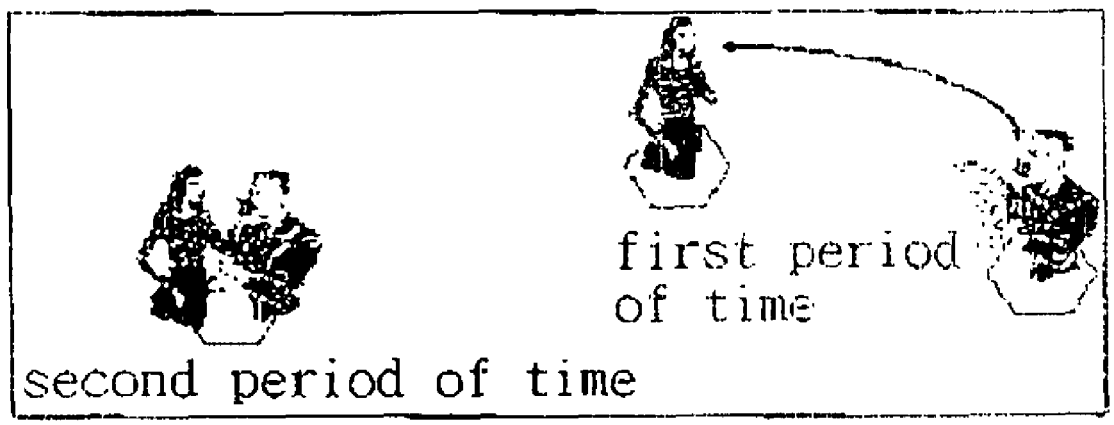
FIG. 1 is a diagram showing the call behavior of a mobile user cluster.

In this specification, a "mobile user cluster" means that each mobile user thereof transmits/receives a call to/from another mobile user of the same cluster and appears at a same geographical location during a certain period of time. An example of the mobile user cluster is a cohabiting family. During the daytime, the cohabiting family members may go to work or school at different locations and make calls to each other; during the nighttime, the family members go back home (i.e. at the same geographical location) to get together. Another example is acquainted colleagues, who appear at the working site (e.g. office) during the daytime, while leave the working site and may make calls to each other during the nighttime. One more example is schoolmates, who gather at the school during the school time, while disperse to their homes and may make calls to each other during the after-school time. FIG. 1 is a diagram showing the call behavior of the mobile user cluster. As shown, the cluster members disperse to various locations and call to each other during a first period of time, e.g. daytime (the hexagon denotes the cell at or near the location of the cluster member). During a second period of time, e.g. nighttime, the cluster members gather at the same location, and may make calls to another mobile user (usually outside the cluster) via the cell at or near the same location. Therefore, the mobile user cluster can be identified according to the CDRs generated during the first and second periods of time.

Figure 2:
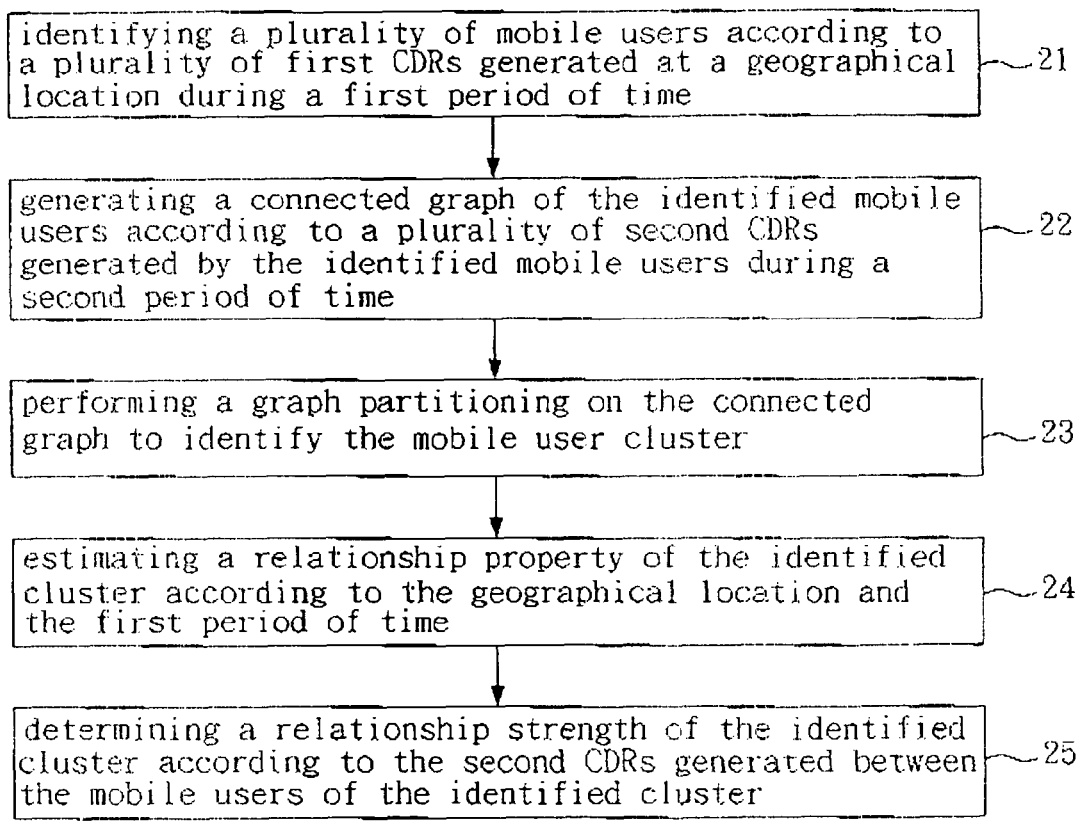
FIG. 2 is a flowchart of a preferred embodiment of the method for identifying a mobile user cluster by CDRs according to the present invention.

FIG. 2 is a flowchart of a preferred embodiment of the method for identifying a mobile user cluster by CDRs according to the present invention. The flow in FIG. 2 includes steps of:

21 identifying a plurality of mobile users according to a plurality of first CDRs generated at a geographical location during a first period of time;

22 generating a connected graph of the identified mobile users according to a plurality of second CDRs generated by the identified mobile users during a second period of time;

23 performing a graph partitioning on the connected graph to identify the mobile user cluster;

24 estimating a relationship property of the identified cluster according to the geographical location and the first period of time; and 25 determining a relationship strength of the identified cluster according to the second CDRs generated between the mobile users of the identified cluster.

The first and second CDRs refer to voice and data call detail records, which include records for voice call and short messages in text or multimedia formats.

In step 21, the first CDRs are generated by a base transceiver station (BTS) at or near the geographical location. Though the term of BTS is used in a GSM network, people skilled in the art can easily apply this technological feature to other mobile communication networks. Thus, the scope of the present invention is not limited to the GSM network. By examining the caller and callee recorded in each first CDR, the mobile user appearing at the geographical location during the first period of time can be identified. In another embodiment, step 21 identifies the mobile user appearing at the geographical location during the first period of time by examining the locations of the caller and callee recorded in the CDRs generated by a plurality of mobile users during the first period of time.

Figure 3A:
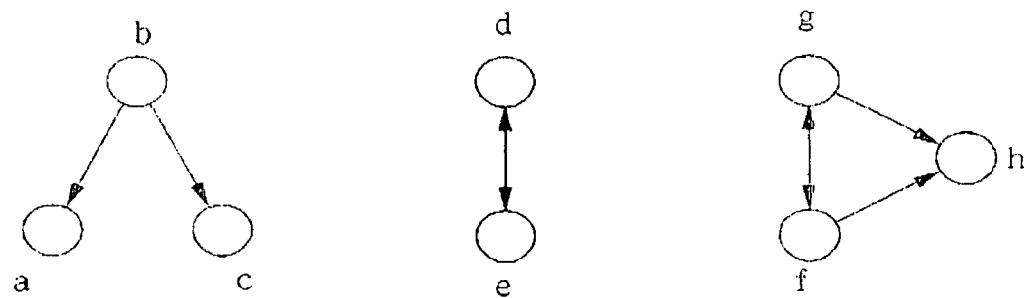
FIG. 3A is a diagram showing an example of the connected graph.

In step 22, the connected graph is generated according to the callers and callees recorded in the second CDRs. FIG. 3A shows an example of the connected graph, which contains eight mobile users (denoted as vertices a to h). An edge between two vertices means that at least one second CDR is generated between two corresponding mobile users, and the arrow of the edge is pointed at the callee.

Figure 3B:
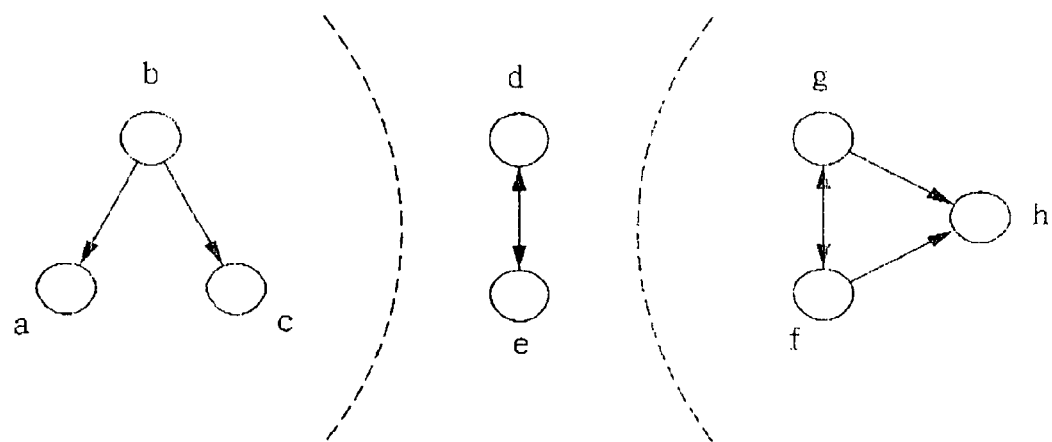
FIG. 3B is a diagram showing a result of the graph partitioning on the connected graph of FIG. 3A.

In step 23, the graph partitioning is performed according to the connection relation among the identified mobile users. Any two mobile users within each identified mobile user cluster forms a mobile user sequence. That is, at least one second CDR is generated between any two neighboring mobile users within the mobile user sequence. FIG. 3B shows a result of the graph partitioning on the connected graph in FIG. 3A. As shown in FIG. 3B, the eight mobile users are partitioned into three clusters. Take the cluster containing a, b, and c as an example. The mobile user sequence {a,b} is formed between a and b, and the second CDR is generated between a and b; the mobile user sequence {a,b,c} is formed between a and c, and the second CDR is generated between a and b, and a and c respectively. Here the algorithm used for the graph partitioning is well known to people skilled in the field of information science or applied mathematics.

In another embodiment, step 22 generates a mathematic expression corresponding to a connected graph of the identified mobile users according to the callers and callees recorded in the second CDRs. For instance, in FIG. 3A, an edge between any two vertices (e.g. a and b) can be expressed as $$a \xrightarrow{k} b,$$

where k is a strength value for the edge. The strength value k can be determined according to the amount of the second CDRs generated between a and b, or the corresponding total call duration or call cost. Then, step 23 performs a statistical induction method on the mathematic expression to identify the mobile user cluster. Here the generation of the mathematical expression and the statistical induction method are well known to people skilled in the field of information science or applied mathematics.

In step 24, the relationship property of the identified cluster is estimated according to which district the geographical location lies in and which time range the first period of time belongs to. For example, if the geographical location lies in a residential district and the first period of time is nighttime, then the relationship property is estimated to be the cohabiting family or familiar neighborhood; if the geographical location lies in a business district and the first period of time is daytime, then the relationship property is estimated to be the colleague.

In step 25, the relationship strength is determined according to the amount of the second CDRs generated between the mobile users of the identified cluster. That is, the larger the amount is, the stronger the relationship strength is, and vice versa. In another embodiment, the relationship strength is determined according to the total call duration corresponding to the second CDRs generated between the mobile users of the cluster. That is, the longer the total call duration is, the stronger the relationship strength is, and vice versa. In still another embodiment, the relationship strength is determined according to the total call cost corresponding to the second CDRs generated between the mobile users of the cluster. That is, the larger the total call cost is, the stronger the relationship strength is, and vice versa. The relationship strength can also be shown in the connected graph. For instance, in FIG. 3A, a corresponding strength value can be added beside each edge to represent the respective relationship strength between two mobile users. Then, the relationship strength of the whole cluster is determined according to that between any two mobile users within the cluster. In a simplified embodiment, if no CDR is generated between the two users, then the corresponding strength value is set to zero; if at least one CDR is generated, then the strength value is set to one.

In this way, the mobile service provider can conduct marketing campaigns for the mobile user cluster with specific relationship property and strength. For instance, the relationship of the cohabiting family is usually stable and intimate. If a cluster of cohabiting family members is determined to have a strong relationship strength and also subscribes to different mobile service providers, then a favorable intra-network fare rate can be provided for the cluster to induce its members to subscribe to the same service provider.

Figure 4:
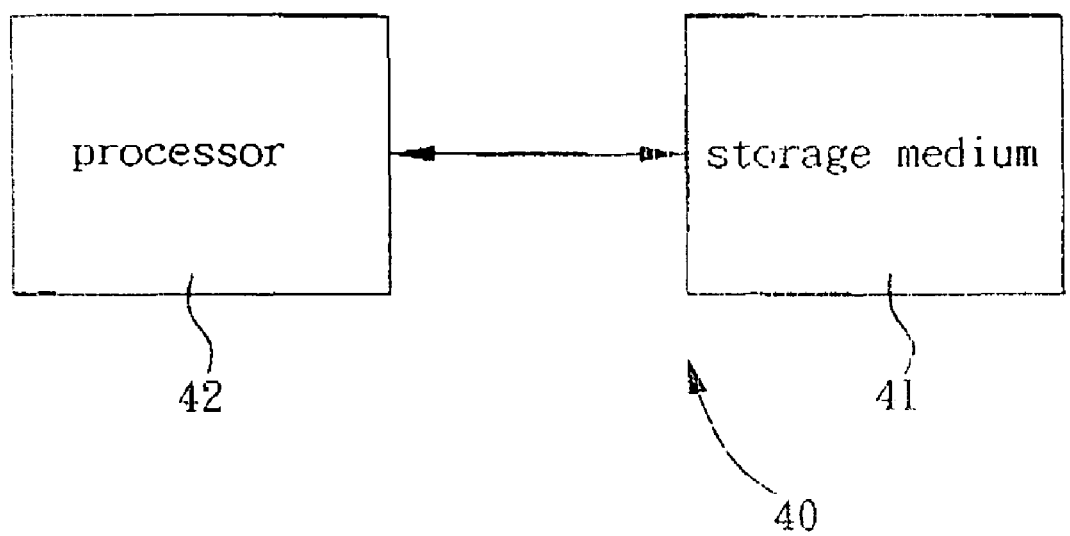
FIG. 4 is a block diagram of a preferred embodiment of the system for identifying a mobile user cluster by CDRs according to the present invention.

FIG. 4 is a block diagram of a preferred embodiment of the system for identifying a mobile user cluster by CDRs according to the present invention. As shown in FIG. 4, the system 40 includes a storage medium 41 and a coupled processor 42. The storage medium 41 is for storing a plurality of CDRs generated by a plurality of mobile users during a first period and a second period of time. The processor 42 is for identifying at least one mobile user cluster according to the CDRs stored in the storage medium 41. Each mobile user of the identified cluster generates at least one CDR at a same geographical location during the first period of time, and a mobile user sequence is formed between any two mobile users of the identified cluster. At least one CDR is generated between any two neighboring mobile users of the mobile user sequence during the second period of time.

When identifying the mobile user cluster among the mobile users, the processor 42 first identifies a plurality of first mobile users according to the CDRs generated by the mobile users during the first period of time, wherein the first mobile user generates at least one CDR at a BTS at or near the same geographical location during the first period of time. Then, the processor 42 generates a connected graph of the first mobile users according to the CDRs generated by the first mobile users during the second period of time, and performs a graph partitioning on the connected graph to identify the mobile user cluster.

Furthermore, the processor 42 can estimate a relationship property of the identified cluster according to the same geographical location and the first period of time, and determine a relationship strength of the identified cluster according to the CDRs generated between the mobile users of the identified cluster. As to the estimation of the relationship property and the determination of the relationship strength, please refer to the previous description.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A method for identifying a mobile user cluster by call detail records comprising steps of:
    identifying a plurality of mobile users by a processor according to a plurality of first call detail records generated at a geographical location during a first period of time and stored in a storage medium;
    generating a connected graph of the mobile users by the processor according to a plurality of second call detail records generated by the mobile users during a second period of time and stored in the storage medium, wherein in the connected graph, any two of the mobile users are connected if at least one of the second call detail records is generated therebetween; and
    identifying at least one mobile user cluster by the processor according to the connected graph, wherein in the mobile user cluster, any two mobile users are directly connected or connected via at least another mobile user;
    wherein identifying at least one mobile user cluster comprises:
    generating a mathematic expression corresponding to the connected graph of the identified mobile users according to the second call detail records; and
    performing a statistical induction method on the mathematic expression to identify the mobile user cluster;
    wherein each mobile user of the mobile user cluster identified according to the connected graph appears at the geographical location during the first period of time.

2. The method of claim 1, wherein the step of identifying at least one mobile user cluster comprises:
    performing a graph partitioning on the connected graph to identify the mobile user cluster.

3. The method of claim 1, wherein in the step of identifying a plurality of mobile users, the first call detail records are generated by a base transceiver station (BTS) at or near the geographical location.

4. The method of claim 1, further comprising:
    estimating a relationship property of the identified mobile user cluster according to which kind of district the geographical location lies in and which time range the first period of time belongs to.

5. The method of claim 4, wherein if the geographical location lies in a residential district and the first period of time is nighttime, the relationship property of the identified mobile user cluster is estimated to be a cohabiting family or familiar neighborhood.

6. The method of claim 4, wherein if the geographical location lies in a business district and the first period of time is daytime, the relationship property of the identified mobile user cluster is estimated to be colleagues.

7. The method of claim 1, further comprising:
    determining a relationship strength of the identified mobile user cluster according to the second call detail records generated between the mobile users of the identified mobile user cluster.

8. The method of claim 7, wherein the relationship strength is determined according to an amount of the second call detail records generated between the mobile users of the mobile user cluster.

9. The method of claim 7, wherein the relationship strength is determined according to a call duration corresponding to the second call detail records generated between the mobile users of the mobile user cluster.

10. The method of claim 7, wherein the relationship strength is determined according to a call cost corresponding to the second call detail records generated between the mobile users of the mobile user cluster.

11. A system for identifying a mobile user cluster by call detail records comprising:
    a storage medium for storing a plurality of first and second call detail records, wherein the first call detail records are generated at a geographical location during a first period of time; and
    a processor, coupled to the storage medium, for identifying a plurality of mobile users according to the first call detail records, generating a connected graph of the mobile users according to the second call detail records which are generated by the mobile users during a second period of time, and identifying at least one mobile user cluster according to the connected graph;
    wherein identifying at least one mobile user cluster comprises:
    generating a mathematic expression corresponding to the connected graph of the identified mobile users according to the second call detail records; and
    performing a statistical induction method on the mathematic expression to identify the mobile user cluster;
    wherein in the connected graph, any two of the mobile users are connected if at least one of the second call detail records is generated therebetween; in the mobile user cluster, any two mobile users are directly connected or connected via at least another mobile user; and
    wherein each mobile user of the mobile user cluster identified according to the connected graph appears at the geographical location during the first period of time.

12. The system of claim 11, wherein the processor estimates a relationship property of the identified mobile user cluster according to which kind of district the geographical location lies in and which time range the first period of time belongs to.

13. The system of claim 12, wherein if the geographical location lies in a residential district and the first period of time is nighttime, the relationship property of the identified mobile user cluster is estimated to be a cohabiting family or familiar neighborhood.

14. The system of claim 12, wherein if the geographical location lies in a business district and the first period of time is daytime, the relationship property of the identified mobile user cluster is estimated to be colleagues.

15. The system of claim 11, wherein the processor determines a relationship strength of the identified mobile user cluster according to the second call detail records generated between the mobile users of the identified mobile user cluster during the second time of period.

16. The system of claim 15, wherein the relationship strength is determined according to an amount of the second call detail records generated between the mobile users of the mobile user cluster.

17. The system of claim 15, wherein the relationship strength is determined according to a call duration corresponding to the second call detail records generated between the mobile users of the mobile user cluster.

18. The system of claim 15, wherein the relationship strength is determined according to a call cost corresponding to the second call detail records generated between the mobile users of the mobile user cluster.

19. The system of claim 11, wherein the first call detail records are generated by a base transceiver station (BTS) at or near the geographical location.

* * * * *